Patented Oct. 29, 1935

2,018,994

UNITED STATES PATENT OFFICE 2,018,994

PROCESS FOR THE PARTIAL OXIDATION OF HYDROCARBONS

Stephen P. Burke, Plainfield, and Charles F. Fryling, Metuchen, N. J., assignors to Doherty Research Company, New York, N. Y., a corporation of Delaware No Drawing. Application April 13, 1929, Serial No. 354,980

6 Claims. (Cl. 260—138)

This invention relates to processes for producing valuable intermediate oxidation products from hydrocarbons, and more especially it pertains to a method for treating normally gaseous hydrocarbons under suitable conditions to cause a homogeneous partial oxidation reaction in the presence of homogeneous or gas phase catalysts or reaction promotors to produce such partial oxidation products as alcohols, aldehydes and the like. This application covers subject matter closely related to that of our co-pending application Serial No. 334,589 for United States Patent, filed January 23, 1929 relating to Treatment of hydrocarbons and it is to be regarded as a continuation in part of the subject-matter of the said co-pending application.

The present invention is based upon the discovery that partial oxidation reactions between hydrocarbons and oxygen-containing substances are substantially facilitated by a certain group of substances which may be broadly defined as lower alkyl ethers. Among such substances may be mentioned methyl ether, ethyl ether, and the like. It will be observed that while certain of these substances are liquid at normal temperatures and pressures but may be readily volatilized at temperatures below that at which they are caused to react in the partial oxidation process, other substances of the group, such as methyl ether exist as gases at atmospheric temperature. The presence of these substances, referred to hereafter as catalysts or reaction promotors, affects the character of the partial oxidation reaction, first by causing the reaction to occur at a lower temperature than that at which the uncatalyzed reaction occurs; and second, the velocity of the partial oxidation reaction does not vary as rapidly with temperature variations when such catalysts are present, as where they are absent.

Among the principal objects of the present invention are the following: To provide an improved process for obtaining satisfactory yields of partial oxidation products of hydrocarbons and oxygen-containing gases at relatively low temperatures; to provide in an improved manner for controlling the velocity of a homogeneous partial oxidation reaction between hydrocarbons and an oxygen-containing gas; to provide in a process for the preparation of liquid partial oxidation products from hydrocarbons in which process homogeneous catalysts are employed, for reducing or limiting the corrosiveness of the liquid drip or mixture containing the said oxidation products; and to provide in such partial oxidation reaction for avoiding both the over-heating of the reaction mixture and the decomposition of the reaction products.

The partial oxidation reactions leading to the formation of aldehydes, alcohols and similar intermediate oxidation products in accordance with the present invention are chiefly homogeneous in character, at least under the conditions of operation to be described.

The present invention in its broadest sense may be said to comprise the inter-mixing of a hydrocarbon or a mixture of hydrocarbons with an oxygen-containing gas, such as air or oxygen, preferably after preheating both the hydrocarbons and the air to suitable temperatures, and subjecting the mixture in the presence of a relatively small amount of a suitable gaseous reaction promotor or catalyst such as ethyl ether, for a relatively short period of time, to a reaction temperature adapted to facilitate the formation and preservation of the partial oxidation products mentioned, after which the latter products are withdrawn in gaseous state from the reaction vessel, and the normally liquid portions thereof are condensed and thereafter further treated for the independent recovery therefrom of the methanol, formaldehyde and the like.

The following is a brief description of a specific application of the invention in the partial oxidation of commercial propane:—

Diethyl ether was mixed with liquefied propane, and a measured volume of this mixture was vaporized. Sufficient diethyl ether was employed to give a gaseous mixture containing .8% by volume of ether. The said gaseous mixture was then further admixed with air in amounts sufficient to give an oxygen-content to the resultant gas mixture of 5.9%. The gas mixture was then passed under a pressure of 750 pounds per square inch through an aluminum lined reaction tube $\tfrac{7}{16}$″ in inside diameter and 20″ long, at a rate of flow of 15½ cubic feet per hour. The reaction tube was immersed in a fused nitrate bath maintained at a uniform temperature of about 350° C. The rate of passage of the reaction mixture through the tube was such that the time of sojourn of any unit volume thereof in the reaction tube was approximately .185 seconds. The products of the reaction were immediately and rapidly cooled upon leaving the reaction zone. (It is possible to recover part of the sensible heat of these hot gases by passing them in heat exchange relationship with the gaseous hydrocarbon and with the air as the latter two pass to the reaction vessel.) The condensable or normally liquid partial oxidation products formed during the course of the reaction were removed from the normally gaseous reaction products by suitable condensing and absorption equipment as for example that of the type disclosed in our aforesaid co-pending application Serial No. 334,589. Among the products of the said reaction are water, methanol, acetaldehyde, formaldehyde, together with other alcohols, aldehydes, ketones, acids and the like.

In partial oxidation reactions catalyzed by means of gaseous catalysts of the kind disclosed here, the employment of reaction mixtures of low initial oxygen concentration and the maintenance of high pressures, high rates of flow, and low temperatures in the reaction zone are generally conducive to the production of a liquid mixture of partial oxidation products or drip of relatively high molecular weight and of relatively low water content. The average molecular weight of the liquid product obtained by the partial oxidation of propane in accordance with the process disclosed above depends upon a number of factors such as the degree to which the hydrocarbons and the oxygen-containing gases are heated above the temperature of half reaction prior to their introduction into the reaction chamber, the temperature and the pressure at which the gases are reacted, the rate of flow of the gas mixtures through the reaction zone, the initial oxygen content thereof and the character and amount of the catalyst employed. For instance, in the example given above, when a preheat of 9° C. above the temperature of half reaction (348° C.) was employed, the molecular weight of the drip was 38.2, as compared with a drip molecular weight of 33.7 in a similar instance but in which a preheat of 22° C. above the temperature of half reaction was employed. The molecular weight of pure water is 18. The gaseous residue from the partial oxidation reaction is ordinarily free from uncombined oxygen and may be used as a fuel or may be admixed with another portion of air or the like and subjected to a second partial oxidation treatment.

In treating natural gas containing large proportions of methane under the conditions of pressure and the like just specified, it has been found preferable to employ reaction temperatures in the range of 425° to 500° C. On the other hand, in treating butane, the reaction temperature may be lowered to about 325° C. The most advantageous temperature range at which to carry out the partial oxidation of propane is fairly wide (depending upon the pressure, size of the reaction vessel and the other conditions of reaction). This range includes temperatures of from 300° C. to about 450° C. In the above example in which .8% of ethyl ether was employed, the temperature of half reaction was 348° C. compared with a temperature of 366° C. where no gaseous catalyst was employed, and compared with a temperature of 330° C. where 1.4% of ethyl ether was used, the other conditions under which the reaction occurs being maintained substantially the same. The above mentioned values for the temperature of half reaction are given since it has been found difficult to measure the temperature of the initial reaction, while there is no such difficulty in measuring the temperature at which half of the oxygen in the initial reaction mixture has entered into combination reactions. The temperature of half reaction is an arbitrary point on a curve obtained by plotting the temperature at which the partial oxidation reaction occurs against the oxygen content of the reaction mixture after the reaction has occurred at the temperature indicated. The term is more fully illustrated in the aforementioned copending application Serial No. 334,589.

Strictly speaking, the action of diethyl ether cannot be described wholly as catalytic in the reaction with hydrocarbon and oxygen since the ether is known to form organic peroxides, readily, and since it here apparently undergoes a certain amount of oxidation. It appears to act like a detonator in initiating the desired partial oxidation reaction and promoting the desired reaction by causing the formation of reaction chains at lower temperatures than would be possible under similar conditions in uncatalyzed reactions. For example in the treatment of propane with 1.4% of diethyl ether in which the other conditions of the reaction are similar to those stated above in the specific example given, the yield of liquid drip is very materially increased over that obtainable in instances where no gaseous catalyst was employed. The average molecular weight of the drip where 1.4% ether was employed amounted to 34.1 as compared to an average of about 32.1 where no catalyst was used.

The following example is given to show the effect of methyl ether upon the partial oxidation of a "lean" natural gas mixture having a methane content of 85.4% and which was substantially free of the higher hydrocarbons. Oxygen was employed as the oxidizing agent in the treatment of the said natural gas according to the procedure outlined below. .57% of dimethyl ether was mixed with the said natural gas, and the mixture was then passed under 750 pounds pressure at a rate of flow of 14.6 cu. ft. per hour through a 154" section of steel tubing at $\tfrac{1}{16}$" I. D. immersed in an externally heated bath of molten lead solder held at a temperature of about 450° C. The temperature of half reaction was 428° C. as compared with a temperature of 448° C. for the temperature of half reaction in the process carried out in the absence of a gaseous catalyst but otherwise performed under the same conditions. The catalyzed reaction using methyl ether in the above amount gave a formaldehyde yield of over three times that obtained and a methanol yield about twice that obtained per cubic foot of the gas mixture reacted where no catalyst was employed.

In this experiment since the expansion of methane does not absorb sufficient heat to make possible the refrigeration of the gaseous reaction products, it was necessary to first expand the latter into a glass adaptor whereby a temperature of approximately 12° C. was obtained and a considerable proportion of the drip was collected at this temperature. The stripped gas mixture was then refrigerated at the temperature obtained in an ice-salt mixture whereupon further condensation of drip occurred. The remaining gas was washed with water to recover the last traces of partial oxidation products. Approximately one-third of the formaldehyde obtained, and about two-thirds of the methanol recovered was obtained from the said wash water. By subtracting the weight of the methyl ether employed from the total yield of organic partial oxidation products (formaldehyde+methyl alcohol) a figure is obtained which may be taken to represent the partial oxidation products produced in the reaction in excess of the methyl ether employed. The results obtained indicate the production in the above sample of substantially increased yields of these partial oxidation products per cubic foot of natural gas over those normally produced when no catalyst is employed and that which might be accounted for as decomposition products of the methyl ether, and indicate that the yield of partial oxidation products from natural gas consisting principally of methane is materially increased by the use of a gaseous catalyst such as methyl ether.

In another experimental run a natural gas-oxygen-methyl ether mixture containing the above mentioned natural gas together with .57% of methyl ether and 5% of oxygen, was flowed through a reaction chamber such as that employed in the last mentioned run, under a pressure of 300 pounds per square inch, at a rate of flow of 15.1 cubic feet per hour. Under the conditions named the temperature of half reaction was 504.5° C., and the molecular weight of the drip therefrom was slightly lower than that of the drip obtained under similar conditions excepting that the reaction was carried out at a pressure of 750 pounds per square inch.

The ethers such as methyl ether and ethyl ether are of particular value as catalysts or reaction promotors in the partial oxidation reactions of the type described above due to the fact that they are substantially non-corrosive and therefore cannot attack the apparatus in which the said reactions are carried out either by their own action or by the action of their decomposition products. Moreover methyl ether itself may be readily prepared from the methanol content of the drip obtained from the partial oxidation of the hydrocarbons. The ethers are very volatile, and no difficulties have been encountered in introducing them into the reaction mixture in any desired amounts. It is not essential to use as catalysts highly purified ethers, and there is considerable advantage in employing ethers that have been subjected to a slight preliminary oxidation at least to the extent of partial peroxide formation as for example by exposure of the ether to the light in the presence of air. It is well known that ether has the property of readily forming organic peroxides, and the presence of small amounts of the latter improve the capacity of the ethers as catalysts, evidently facilitating the partial oxidation reaction. This may possibly be due to the ability of the peroxides to serve as oxygen carrying materials.

In connection with preheating of the gaseous hydrocarbons and the oxygen-containing gas prior to their intermixture and passage into the reaction zone, it has been determined that raising the degree of preheat in these gases above the temperature of that of half reaction results in a decrease in the acidity of the drip obtained, which decrease, at constant pressure and rate of flow, has been found to be substantially linear with increase of temperature above the reaction temperature. Moreover, increasing the degree of preheat above the temperature of half reaction results in a decrease in the molecular weight of the drip obtained.

In general, the various characteristics of the non-catalyzed homogeneous partial oxidation reactions disclosed in our co-pending patent application Serial No. 334,589 already referred to are broadly applicable to the process forming the subject matter of the present invention in which gas-phase catalysts are employed.

It will be obvious that this invention is not limited to a treatment of a pure hydrocarbon or of mixtures thereof, but is broadly applicable to any mixture of gases containing a hydrocarbon in substantial proportions, either with or without other oxidizable gases such as carbon monoxide and hydrogen, and with or without such relatively inert gases as nitrogen and carbon dioxide. For example, such gaseous mixtures as natural gas, manufactured gas and still gases from the various processes for distilling petroleum and other bituminous materials, are particularly suitable for use as starting materials in carrying out the substance of the present invention.

Normally the liquid partial oxidation products will contain small amounts of organic acids such as formic acid, acetic acid and the like. These acid products are however, dissociated in the drip to a relatively small degree and exert a relatively slight corrosive action upon metal surfaces. It is possible to control within certain limits the concentration of these organic acids in the drip by properly selecting the hydrocarbons to be oxidized and the conditions under which the process is performed. The lower molecular weight hydrocarbons of the paraffin series normally produce drips of relatively low acidity.

While particularly good results and relatively high yields of partial oxidation products are secured when carrying out the reaction in a single step under high pressures, such as that indicated, the gases may be recirculated through the reaction zone repeatedly, after adding thereto the necessary amounts of air or oxygen containing gas and hydrocarbons to maintain the desired hydrocarbon-air ratio. The proportions of hydrocarbons, oxygen-containing gas and catalyst, may be varied within fairly wide limits. The process is susceptible of modification within the scope of the appended claims.

We claim:

1. The process of producing intermediate oxidation products from a hydrocarbon-containing gas which comprises mixing together the said hydrocarbon-containing gas, an oxygen-containing gas and a small amount of a lower alkyl ether, and heating the same under superatmospheric pressure to a temperature suitable for producing the desired reaction, rapidly cooling the resultant reaction products as formed and thereafter separating from the reaction products the condensable intermediate oxidation products thereof.

2. The process as defined in claim 1 in which the alkyl ether is partially oxidized.

3. The process as defined in claim 1 in which the alkyl ether consists of methyl ether.

4. The process of converting hydrocarbons into partial oxidation products which comprises heating a reaction mixture containing a hydrocarbon and less than ten per cent by volume of said hydrocarbon of free oxygen to a reaction temperature under high superatmospheric pressure in the presence of a lower alkyl ether.

5. In the process of producing intermediate hydrocarbon partial oxidation products, the steps of heating a mixture of a hydrocarbon-containing gas and an oxygen-containing gas in the presence of a small amount of a lower alkyl ether.

6. The process of producing normally liquid hydrocarbon partial oxidation products which comprises preheating a gaseous hydrocarbon, separately preheating an oxidizing gas, then mixing the same and passing the mixture under high superatmospheric pressure directly into and continuously through a heated reaction zone at a high rate of flow while admitting to the reaction zone a small amount of a lower alkyl ether, and thereafter quickly cooling the resultant reaction products.

STEPHEN P. BURKE.
CHARLES F. FRYLING.